Dec. 9, 1924. Re. 15,962
W. E. WINE
CAR DOOR DEVICE
Original Filed July 25, 1922
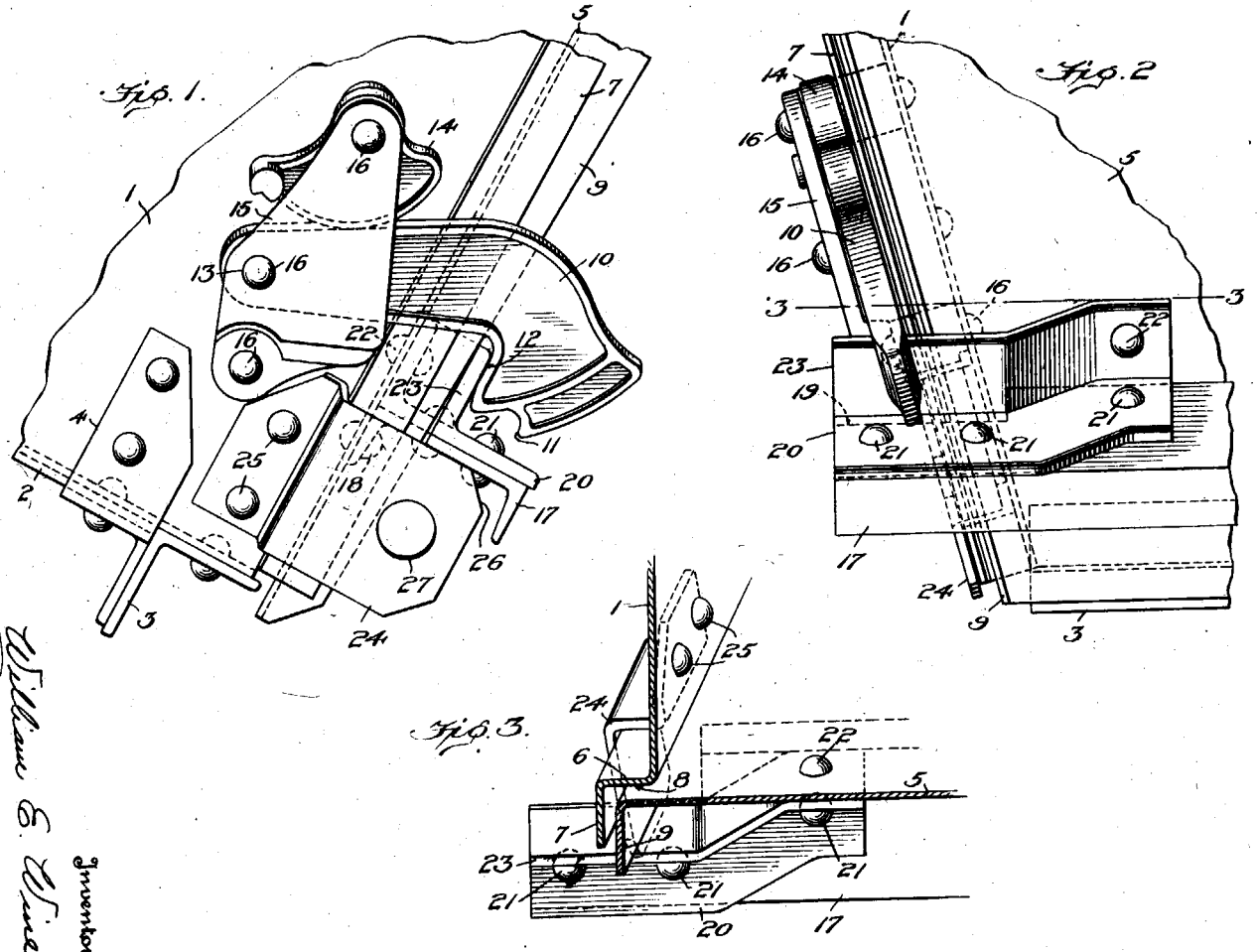
Inventor
William E. Wine
By Potter & Meechin
his Attorney Reissued Dec. 9, 1924.

Re. 15,962

UNITED STATES PATENT OFFICE.

WILLIAM E. WINE, OF TOLEDO, OHIO, ASSIGNOR TO WINE RAILWAY APPLIANCE COMPANY, OF TOLEDO, OHIO, A CORPORATION OF OHIO.

CAR-DOOR DEVICE.

Original No. 1,436,927, dated November 28, 1922, Serial No. 577,351, filed July 25, 1922. Application for reissue filed October 9, 1924. Serial No. 742,673.

*To all whom it may concern:*

Be it known that I, WILLIAM E. WINE, a citizen of the United States, residing at Toledo, in the county of Lucas and State of Ohio, have invented certain new and useful Improvements in Car-Door Devices, of which the following is a specification.

This invention relates to a door device for railway cars or the like, and has for its object to provide an improved mechanism whereby the door may be forced shut, and also whereby the door may be held in closed position without slippage. The invention consists of the formation, combination and arrangement of parts as will be herein described and particularly claimed. In the accompanying drawings, which show a preferred embodiment of the invention, Figure 1 is a fragmentary side elevational view, showing a portion of a railway car having a door device applied thereto, the same being constructed in accordance with the principles of the present invention.

Figure 2 is a fragmentary end elevational view of the same.

Figure 3 is a fragmentary horizontal cross sectional view taken through the door and the adjacent portions of the car body, this view being taken substantially on the line 3—3 of Figure 2.

Referring to these drawings, the side of the car is denoted by the numeral 1, the portion of the car side indicated being the side plate at the lowermost portion of the chute in the ordinary twin hopper type of car construction, which type of construction is well known in the art. The floor or chute plate is shown at 2, and at 3 is indicated a reinforcing angle iron such as is frequently employed to stiffen the lower edge of the chute plate. A brace 4 may be used for tying the side plate 1 to the chute plate 2.

The discharge opening is defined by the edges of the side plates such as 1 and the edge of the chute plate 2 and is normally closed by means of a door such as 5, which faces substantially against the edges of the discharge opening when in closed position. This door is shown as lying in a slightly inclined position. The position of the door, however, is not of importance in the present invention except that the invention is best applicable to doors which lie in a generally vertical plane. The hinge points of the door are usually located along the uppermost edge of the discharge opening and near the upper edge of the door. The hinges are not indicated in the drawing, as these may be of any type or construction.

The edge of the side plate 1 adjacent the discharge opening is preferably offset in an outward direction as at 6, and is then bent back to lie in a plane parallel with the general plane of the car side as at 7, but removed slightly therefrom. By this means, a sealing shoulder 8 is formed, against which the face of the door 5 may seat. A sealing flange 9 is also preferably formed upon the adjacent edge of the door, not only to strengthen the door, but also to cooperate with the flange portion 7 of the car side to form a sealing means for preventing loss of lading.

The door may be closed by hand, a door supporting hook 10 being provided to hold the door in closed position. This hook has a preliminary supporting ledge 11 and a final supporting ledge 12. The hook is pivoted to the car side at 13, and a dog 14 may be supplied for preventing accidental disengagement of the hook. A bracket plate or housing 15 may be supplied to overlie the dog and the hook pivotally associated therewith, and rivets such as 16 may be utilized for affixing these parts to the car body. The hook 10 is arranged to swing along the outer side of the flange 7 of the car side, it being suitably spaced away from the general plane of the car side 1 to allow for the offset in the side plate at 6.

The door may be supplied with the customary door spreader such as the channel 17, which extends horizontally across the outer face of the door and is affixed thereto as by means of rivets 18. This door spreader may extend somewhat beyond the end of the door and must then be coped out at the end, as at 19, to allow it to pass beyond the out-turned flange 9 of the door and beyond the flange 7 of the car side. There is preferably secured to the outermost end of the door spreader 17 a beam or door arm formed as an angle iron 20, which extends along the end of the spreader in a horizontal direction and is riveted to the door spreader by means of the rivets 21, and to the door plate by means of the rivets 22. The angle iron 20 thus affixed to the spreader and to the door serves with the end of the spreader as a door supporting arm, suitable for door supporting engagement with the hook 10. The upstanding leg 23 of the angle iron, where it extends beyond the lines of the car side, is arranged for engagement with either the ledge 11 or the ledge 12 of the hook 10, to support the door respectively in partly or fully closed positions. The hook is arranged to fall by gravity into engaging position with this angle iron or door arm 20, so that it is the preferable construction that the hook shall be arranged with the supporting ledges thereof on the lower edge of the hook.

The severe service and abuse to which such doors are subjected frequently causes the various operating parts to become somewhat disarranged. Particularly there has been trouble experienced with doors of this character slipping downward away from the hinge pintles or toward the rail. With a door-supporting hook, such as is shown and described in the drawings, and particularly where the hook is arranged with the supporting ledges on the lower edge of the hook, this slippage sometimes becomes serious, as it allows the door to creep from engagement with the hook, and the jarring in transit of the car sometimes permits the hook to creep up slightly if there is any clearance between the dog 14 and the back of the hook. These two actions sometimes result in disengagement of the hook and the consequences are serious, as a lading, such as lump coal, if discharged on the track while the car is in transit, may cause derailment or wreck. It is one of the principal objects of the present invention to provide means for use with such a door and particularly with such a door supporting member, whereby slippage of the door away from the hinge pintle thereof will be prevented. To this end there is provided a bracket 24 which is secured to the car side by means of rivets 25. This bracket is arranged to extend outwardly beyond the plane of the closed door, and the upper edge of the same is arranged just beneath the line of swing of the door arm so that it forms a positive abutment or guide for the door arm, in the present instance being engaged by the protruding end of the door spreader 17. The upper outermost corner of the bracket 24 is chamfered or inclined as indicated at 26, in order to form an approach plane whereby the door arm will be caused to ride up into proper position upon the upper edge of the bracket 24. A hole 27 may be provided in the bracket 24 which may be used for the insertion of a lever or other tool to force the door entirely closed or from position upon the preliminary ledge 11 of the hook to position upon the final ledge 12 thereof.

When the door is closed, with the end of the spreader 17 resting upon the upper edge of the bracket 24, and the ledge 12 of the hook 10 in engagement behind the ledge 23 of the door arm angle, and with the pawl 14 driven into proper engagement with the back of the hook, it will be seen that slippage of the door is prevented, and by preventing the door from slacking down away from the hook, creepage of the hook upward is also prevented, as by arresting the first action, in practice, the other is prevented.

Having thus described my invention what is claimed is:—

1. A railway car having a door hinged to the car body, a door supporting hook pivoted to the car body, an arm secured to the door and extending outwardly therefrom beyond an edge of the same, said arm being arranged for engagement with the said hook, and an abutment secured to the car body, the same being formed and located in a manner to engage the said arm to arrest the door against slippage away from the hinged edge thereof.

2. A railway car having a chute with a discharge opening therein, a door hinged to the car along an edge of the discharge opening and arranged to face against the edges of the chute when closed, the door lying in substantially a vertical plane, with the hinges thereof disposed along the uppermost edge of the door and of the discharge opening, a door supporting hook pivoted to the car body and a coengaging arm secured to the door, the same extending outwardly from the door beyond one side thereof, and means cooperating between the car body and the said door arm for preventing the door from dropping away from the hinged edge thereof, the same embodying a bracket secured to the side of the car and overlying the edge of the door, beneath the said door arm, said bracket being formed also as a fulcrum to receive a door prying lever.

3. A railway car having a chute with a discharge opening therein, a door hinged to the car along the upper edge of the discharge opening and disposed substantially in a vertical plane, an arm secured to the door and extending horizontally outward therefrom beyond one side of the door, a hook pivoted upon the car body and arranged for cooperation with the said arm to hold the door in closed position, and a guide bracket secured to the side of the car, the same extending along an edge of the door and beneath the line of swing of the said door arm and arranged to supportingly engage the said arm when the door is in closed position in a manner to hold the door against sagging.

4. A railway car having a hinged door, movable means for holding said door in closed position, and a stop towards and into engagement with which said door moves during its closing movement and which serves to prevent the door from moving away from said holding means when said means are in position for holding said door closed.

5. A railway car having a hinged door, pivotally movable door supporting means, and means on the car body adapted to engage said door during the closing movement thereof for preventing said door when in closed position from moving in its own plane away from said door supporting means when the latter is in position for maintaining the door closed.

6. A railway car having a hinged door, a door supporting hook movably mounted on the car body, an arm carried by said door and adapted to be engaged by said hook to support said door in closed position, and means carried by the car body in spaced relation to the hinged edge of the door for controlling the path of movement of said arm and sustaining said door against slippage in a direction away from its hinged edge, said arm being adapted to come into engagement with said means when the door is being swung to closed position.

7. A railway car having a door, a beam fixed to said door, a hook pivotally supported by said car for holding said door closed by means of said beam, and means fixed to the side of said car forming a stop for preventing movement of said beam away from said hook.

8. A railway car having a door, a beam fixed to said door, a bracket fixed to the side of said car, a hook pivotally supported by said car for holding said door closed by means of said beam, means fixed with respect to said bracket for preventing movement of the beam away from said hook, and means mounted on said bracket for locking said hook in its holding position.

9. Door mechanism for railway cars comprising a bracket adapted to be fixed to a door frame, door holding means movably fixed to said bracket and adapted to pass under a portion of a door associated with said frame, stop means fixed with respect to said bracket for preventing movement of said door portion away from said holding means, and other means for forcing said holding means toward said stop means; whereby said door may be held closed and prevented from moving away from said holding means.

10. Door mechanism for railway cars comprising a bracket adapted to be fixed to a door frame, door holding means movably associated with said bracket and adapted to engage a portion of a door associated with said frame, stop means fixed with respect to said bracket for preventing movement of said door portion away from said holding means, and other means for forcing said holding means toward said stop means, whereby said door may be held closed and prevented from moving away from said holding means.

In testimony whereof I affix my signature.

WILLIAM E. WINE.